United States Patent [19]

Edick et al.

[11] 4,110,676

[45] Aug. 29, 1978

[54] DYNAMOELECTRIC MACHINE AND TACHOMETER

[75] Inventors: John D. Edick, Wickliffe; Kenneth A. Ostrander, Columbus, both of Ohio

[73] Assignee: Reliance Electric Company, Cleveland, Ohio

[21] Appl. No.: 718,798

[22] Filed: Aug. 30, 1976

[51] Int. Cl.² .................. G01P 3/42; H02K 21/12; H02K 16/00
[52] U.S. Cl. .................................. 322/31; 310/112; 310/156; 324/164; 324/174; 322/DIG. 5
[58] Field of Search ............ 310/68, 112, 113, 156, 310/168; 324/163, 164, 165, 174; 322/31, 47, DIG. 5

[56] References Cited

U.S. PATENT DOCUMENTS

| | | | |
|---|---|---|---|
| 2,462,761 | 2/1949 | Momberg | 310/113 X |
| 3,267,399 | 8/1966 | Spieker et al. | 310/156 X |
| 3,317,766 | 5/1967 | Bensa | 310/156 X |
| 3,429,494 | 2/1969 | Chang | 322/31 X |
| 3,626,225 | 12/1971 | Pauwels | 310/168 |
| 3,676,765 | 7/1972 | Westcott | 324/174 UX |
| 3,832,635 | 8/1974 | Cass | 324/174 X |
| 4,011,476 | 3/1977 | Beard | 322/DIG. 5 |

FOREIGN PATENT DOCUMENTS 990,993  5/1965  United Kingdom .............. 324/174

Primary Examiner—Robert J. Hickey
Attorney, Agent, or Firm—Woodling, Krost, Granger & Rust

[57] ABSTRACT

A speed sensing tachometer is built into the end bracket or end bell of a variable speed dynamoelectric machine such as a DC motor. The tachometer is completely recessed and close to the bearing supporting the shaft to occupy a minimum of longitudinal space in the machine. Multiple poles are provided on the rim of the tachometer rotor fastened to the machine shaft and these poles cooperate with first and second Hall effect switches. An electrical circuit is also provided in the same recess in the end bracket and connected to the Hall switches so that the output from the stator of the tachometer includes both a digital and an analog signal output with rotational direction sensing. Such built-in tachometer permits the DC motor to be a double shaft extension motor so that a load, fan or brake may be mounted at each end. The foregoing abstract is merely a resume of one general application, is not a complete discussion of all principles of operation or applications, and is not to be construed as a limitation on the scope of the claimed subject matter.

13 Claims, 7 Drawing Figures

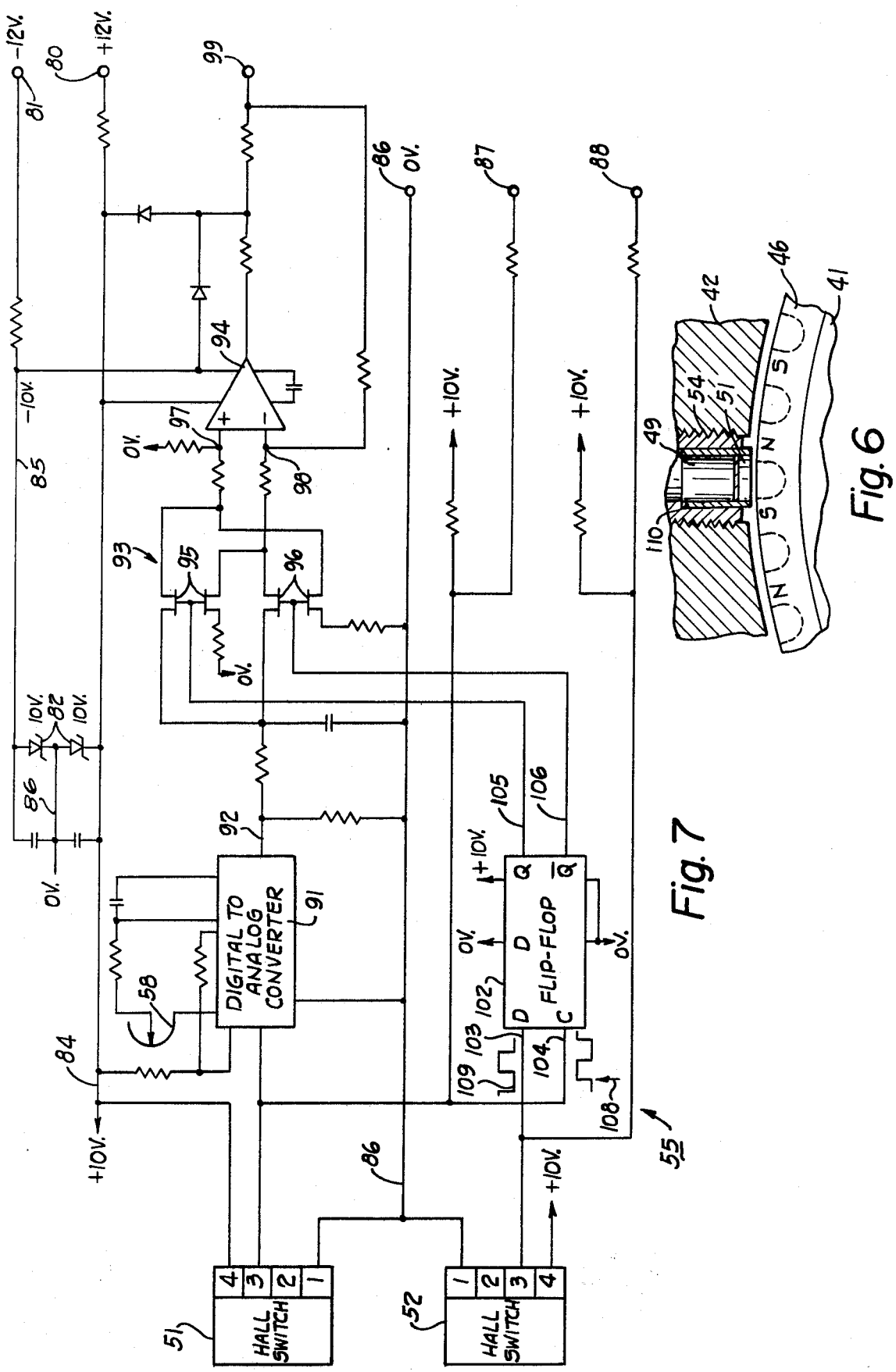

DYNAMOELECTRIC MACHINE AND TACHOMETER

BACKGROUND OF THE INVENTION

Tachometers have been used for many years with variable speed dynamoelectric machines either motors or generators, and perhaps are more commonly used with DC motors which are variable speed devices in order, to provide an accurate indication of the speed of the motor. Quite often this speed signal is returned to an electrical control circuit to correct for any mismatch between the desired and the actual speed. This may be a part of an entire drive system for a large piece of machinery, for example, where it is desired to closely coordinate the speeds of several motors driving different parts of the machinery so that a web, for example, moving through the machinery will not be stretched or broken.

The prior art has known many forms of tachometers, many of which have been constructed as small DC or AC generators in the form of separate dynamoelectric machines with their own bearings and driven in some manner from the shaft of the DC motor, the speed of which is to be sensed. In many cases the DC motor has driven a load at what is termed the back end of the motor and the front end of the motor has been provided with a shaft extension to drive such prior art tachometers. However, there are several occasions when the front end of the motor is not readily available from which to drive such a tachometer. Three such occasions are:

1. Where the DC motor has a double shaft extension, e.g. for tandem motor drives,
2. When a brake may be mounted on the front end of the motor, and
3. When the fan and cover of a totally enclosed fan cooled motor is provided on the front end of such DC motor.

When the front end of the motor is already being used for one of the above-mentioned purposes, then the prior art had difficulty in mounting a tachometer also on such front end of the motor. Such prior art mounting usually took the form of two choices: either a timing belt drive to a laterally mounted tachometer, or else a cantilever mounting of the tachometer with the tachometer driven coaxially from the front end shaft extension. In the former choice, the laterally displaced drive with a timing belt had additional problems of providing a suitable mounting for the tachometer and a suitable drive arrangement with space for the timing belt and pulley. In the latter choice the cantilever coaxial mounting of the tachometer meant that the tachometer increased the length of the motor by a minimum of about five inches and in many cases by as much as twenty-one inches where in combined analog and digital output from the tachometer was desired. In many cases room for such a long tachometer extension was simply not available. In both of these two choices of prior art tachometer mounting, the tachometer was a complete dynamoelectric machine by itself, not only with a rotor and stator but also a frame, end brackets and bearings at both ends of the shaft to support the tachometer rotor. This made an expensive construction. Also in many cases it was necessary to provide a flexible or universal shaft connection because one could not rely on the shaft of the tachometer being exactly coaxial with the shaft of the DC motor. In the prior art type without separate bearings, if the tachometer rotor and stator were not coaxial, then there was the problem of run-out between the tachometer rotor and stator which would give undesirable variations in the tachometer voltage output at a frequency of either one or two times the rotational speed.

SUMMARY OF THE INVENTION

The invention may be incorporated in a combined dynamoelectric machine and tachometer with the dynamoelectric machine having a frame, comprising in combination, an end bracket in said frame surrounding a rotatable shaft of the machine, wall means defining recess means in said end bracket, a tachometer rotor mounted axially within said recess means and connected to be rotated in accordance with rotation of said shaft of the machine, said tachometer rotor having a circular pole piece area with a plurality of magnetic poles, magnetically responsive transducer means having an electrical output, and means mounting said transducer means in said recess means close to said pole piece area of said rotor to be magnetically actuated by rotation of said tachometer rotor.

An object of the invention is to provide a direction sensing analog and digital tachometer built into a motor end bracket.

Another object of the invention is to provide a combined dynamoelectric machine and tachometer wherein the tachometer is a compact unit occupying a minimum of longitudinal space in the dynamoelectric machine.

Another object of the invention is to provide a compact low-cost tachometer stator assembly which mounts the magnetic transducers and contains the digital and analog circuitry in a protected enclosure.

Another object of the invention is to provide a tachometer stator which includes an externally available calibration adjustment and also includes terminals for the power supply and the analog and digital outputs.

Another object of the invention is to provide a tachometer with molded plastic rotor and stator assemblies which are explosion proof and resistant to chemical and moisture environments and also provided with simple locator means for achieving rotor and stator air gap spacing and concentricity.

Other objects and a fuller understanding of the invention may be had by referring to the following description and claims, taken in conjunction with the accompanying drawing.

BRIEF DESCRIPTION OF THE DRAWING

FIG. 6 is a partial enlarged view similar to FIG. 2 and illustrating the rotor poles; and FIG. 7 is a schematic diagram of an electrical circuit usable with the tachometer.

DESCRIPTION OF THE PREFERRED EMBODIMENT

Figure 1:
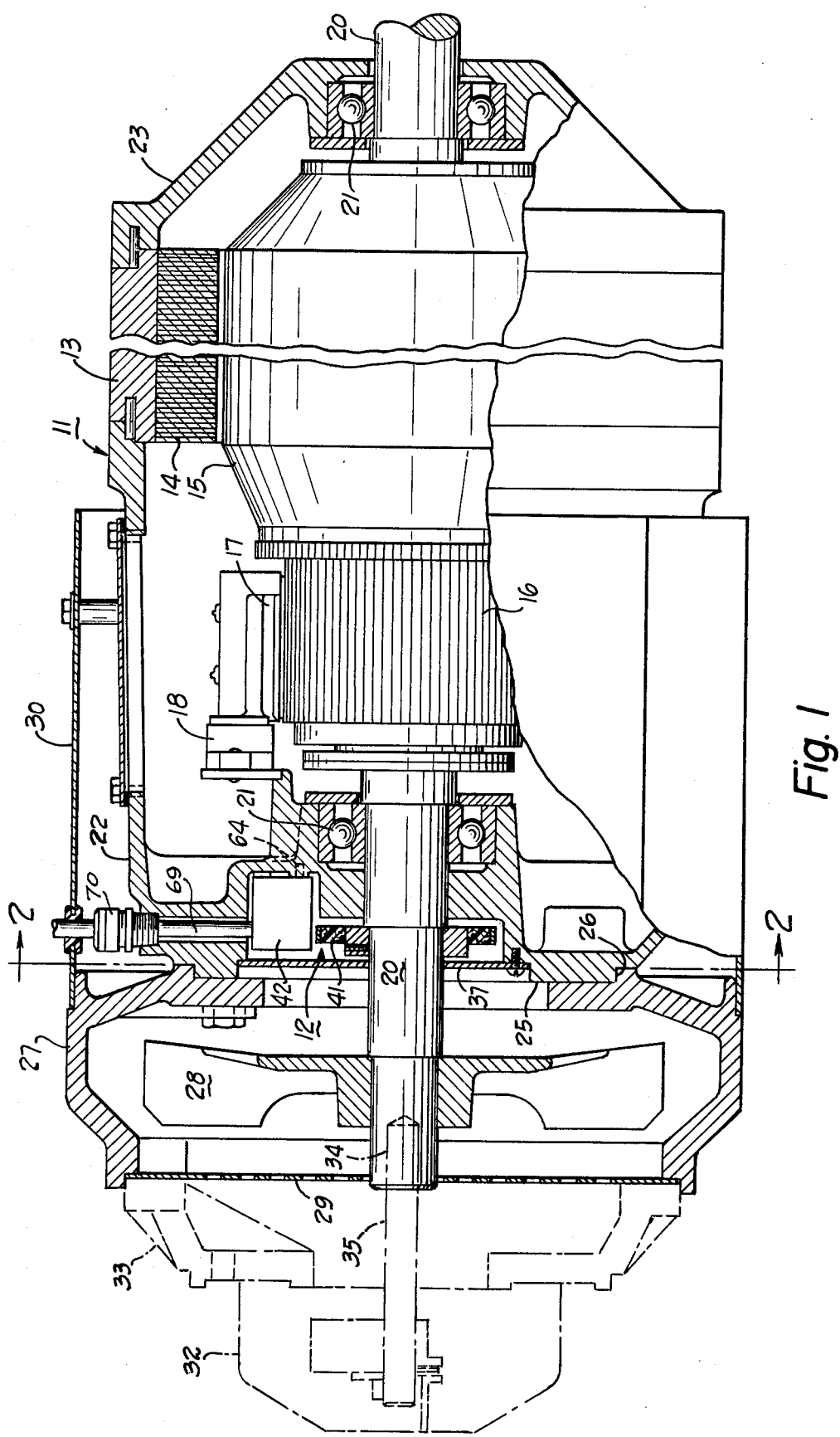
FIG. 1 is a plan view, partly in section, of a combined dynamoelectric machine and tachometer embodying the invention.

FIG. 1 shows generally the construction of a combined dynamoelectric machine 11 and tachometer 12. The dynamoelectric machine may be a generator but in the preferred embodiment is illustrated as a DC motor having variable speed characteristics. Such DC motor includes a frame 13 carrying a stator 14 which includes the pole pieces for a field cooperating with a wound rotor 15 or armature winding. The armature winding is connected to a commutator 16. Brushes 17 held by brush rigging 18 ride on the commutator for external electrical connection to the armature winding 15. The commutator 16 and armature winding 15 are the rotor of the machine 11 fixedly mounted on a shaft 20 journaled in bearings 21 which are mounted in a front end bracket 22 and a rear end bracket 23. The shaft 20 extending from the rear end bracket 23 is adapted to drive the usual load. The commutator 16 is usually provided within the front end bracket 22 in order that any servicing of the brushes or commutator may be at this front end away from the usual load. In FIG. 1, the shaft 20 is shown as a double shaft extension meaning that it extends not only from the rear end bracket 23 but also from the front end bracket 22.

As one example of a use for such a double shaft extension, the dynamoelectric machine 11 is shown as a totally enclosed fan cooled machine. To accomplish this the front end bracket 22 is machined with a short cylindrical coaxial shoulder 26 to provide a National Electrical Manufacturers Association standard "C" face mounting. This coaxial shoulder 26 provides a register fit for a fan cover 27. A fan 28 is mounted on the shaft 20 within the fan cover 27 to have an intake for air through a screen 29 and to have output air directed by a shroud 30 longitudinally along the sides of the motor frame 13.

FIG. 1 also illustrates in the dotted lines the mounting of a prior art tachometer 32. Such a tachometer 32 is shown of the pancake style for minimal added axial length but required a spider 33 for mounting the tachometer 32 in order to provide air openings between the legs of the spider to the screen 29. Also the shaft 20 had to be drilled and reamed at a coaxial aperture 34 to accept a small diameter shaft extension 35 to drive the tachometer 32. This prior art tachometer mount had the problem of shaft concentricity or run-out and also the problem of additional axial length.

Figure 2:
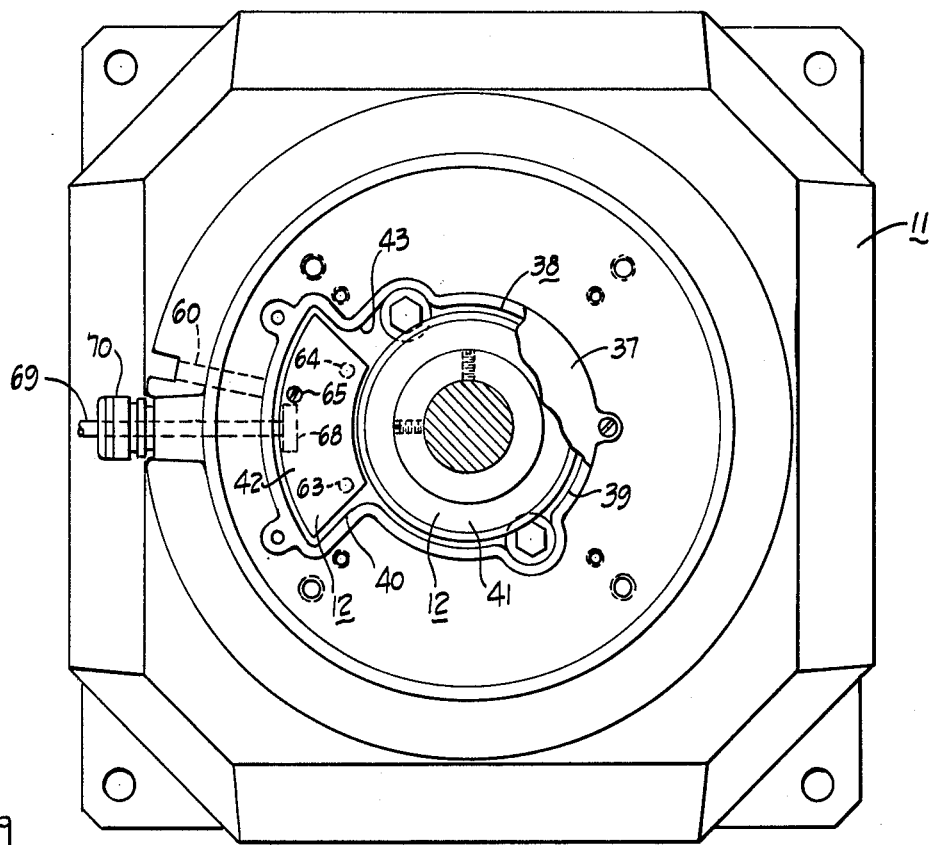
FIG. 2 is a sectional view on line 2—2 of FIG. 1 of the tachometer mounted in the end bracket.
Figure 5:
FIG. 5 is a top view of the tachometer stator.
Figure 4:
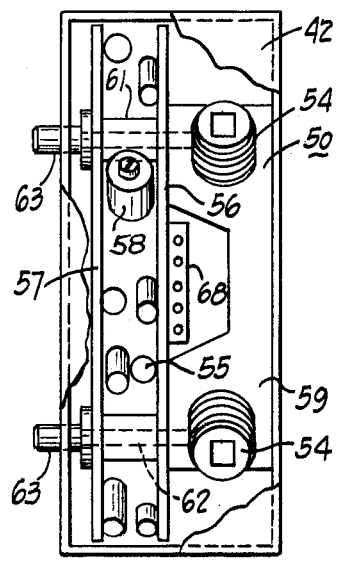
FIG. 4 is a view of the tachometer stator on line 4—4 of FIG. 3 with part of the enclosure broken away.
Figure 3:
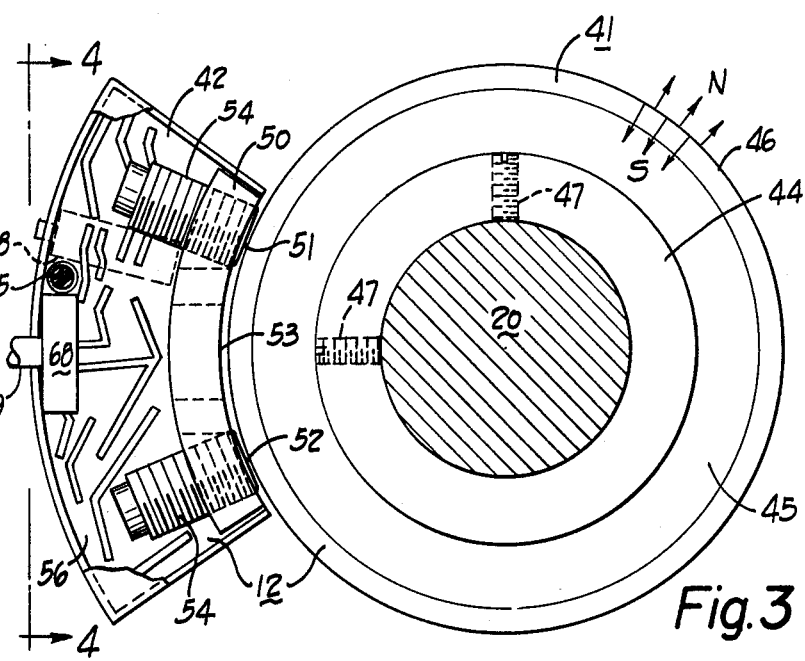
FIG. 3 is an enlarged sectional view of only the tachometer stator and rotor.

FIGS. 2, 3, 4, 5 and 6 show the details of the tachometer 12 of the present invention. Such tachometer 12 is built into the front end bracket 22 closely adjacent the front bearing 21. In FIG. 2 a cover 37 has been broken away to show the structure. A wall 38 has a circular portion 39 and a sector portion 40. The circular wall portion 39 is coaxial with the shaft 20 and encloses a rotor 41 of the tachometer 12. The tachometer 12 is provided with a stator 42 within the sector wall portion 40. This wall 38 provides an axially extending recess within the front end bearing 22 for locating and physically protecting the tachometer 12.

The tachometer rotor 41 is provided with a metal hub 44 which may be of machinable material such as aluminum. Secured to it is a hardened plastic intermediate area 45 carrying a magnetic rim 46. This rim provides a circular pole piece area with a plurality of magnetic poles. In the preferred embodiment this is a large number of magnetic poles and they are radially directed. The magnetic rim may be physically toothed to provide the plural magnetic poles or as in the preferred embodiment may be a smooth cylindrical rim as shown in FIG. 7 into which the north and south poles are permanently magnetized with a neutral area between such poles. The rotor 41 may be held in place on the shaft 20 by set screws 47.

The tachometer stator 42 has a frame 50 on which transducer means 51, 52 is mounted. This transducer means 51, 52 is responsive to the magnetic pole piece area or magnetic rim 46 of the rotor 41 and in the preferred embodiment includes at least a first Hall effect switch 51. Also in this preferred embodiment a second Hall effect switch 52 is provided in order to provide rotational direction sensing. The Hall effect switches 51 and 52 each have an operating surface to be magnetically influenced by the pole piece area 46 of the rotor 41. The frame 50 of the tachometer stator 42 has an arcuate portion 53 in order to accommodate the tachometer rotor 41. The operating surfaces of the Hall switches 51 and 52 extend outwardly from or are closely adjacent to this arcuate surface 53 and may be covered with a thin layer of hardened plastic material for moisture and corrosion resistance. The Hall switches are also mounted in threaded barrels 54 for air gap adjustment.

The frame 50 also mounts speed signal processing circuitry or an electrical circuit 55 and this electrical circuit may be mounted on first and second printed circuit boards 56 and 57. The frame 50 includes a metal base 59 mounting the Hall switches 51 and 52. Other large circuit components such as a range adjustment or calibration adjustment potentiometer 58 are mounted on the circuit boards 56 and 57, which in this preferred embodiment are stacked one on top of the other and are sector shaped for a compact electrical circuit which will fit within the recess 43. The front end bracket 22 is provided with a radially directed aperture 60 to provide tool access to the adjustable potentiometer 58 when the stator 42 is in proper position in the recess 43. Bushings 61 and screws 62 may be used to secure the printed circuit boards 56 and 57 in a spaced position and also fitted into the bushings 61 may be locator means 63. These locator means may be machine screws fitting in apertures in the front end bracket 22 and be slightly enlarged for slight adjustment of the tachometer stator 42. In this way the tachometer stator would be located by shims or feeler gauges. However in the preferred embodiment the locator means 63 are accurately sized dowel pins fitting within close tolerance apertures 64 in the front end bracket 22 to precisely locate the tachometer stator 42 relative to the tachometer rotor 41 for both air gap and concentricity. A mounting screw 65 may be provided through the frame 50 into the front end bracket 22 to secure such tachometer stator 42 in place. Terminal means 68 is provided on the frame 50 for example on one or both printed circuit boards 56 and 57. Individual conductors from a cable 69 are connected to the terminal means 68 and this cable 69 passes through a radially directed fitting 70 on the outer circumference of the front end bracket 22 for external electrical connection to the tachometer 12.

The front end bracket 22 in many dynamoelectric machines is made of cast iron and in such case the bracket material will conduct any leakage flux to the shaft and such flux may improperly influence the Hall effect switches. In such cases magnetic flux shielding is provided for the Hall switches 51 and 52 by providing a metal shield 110 of a high permeability substance, for example, mu-metal so as to capture any leakage flux from the dynamoelectric machine 11 and direct it away from the Hall switches. The front end bracket may be case aluminum, rather than cast iron, but in either case, the electrical conductivity may not provide sufficient RF shielding. Accordingly, the RF shielding may be enhanced by a metal shield 72 around the tachometer stator 42 or at least between the stator 42 and the end bracket 22 in the recess 43. The entire tachometer stator 42 may be potted in a hardened plastic material or may be encased in a thin wall hardened plastic case. This will provide corrosion and moisture resistance for the entire tachometer stator. Also the rotor itself is a combination of metal and molded plastic so that the stator and rotor are intrinsically explosion proof and resistant to chemical and moisture environments.

FIG. 6 shows an enlarged view of part of the tachometer rotor 41 and the magnetic pole piece area 46. The multiple poles formed as permanent magnets are indicated in the FIG. 6 and illustrate that the rotor need not be a toothed rotor, it may have a smooth surface. The Hall switch 51 is illustrated in FIG. 6 as positioned in the threaded barrel 54. A magnetic flux concentrator 49 is preferably used with the Hall switch 51. This concentrator may be an E shape to help provide a return flux path to adjacent poles of the rotor. Alternatively, as shown in FIG. 6, this flux concentrator 49 may be merely a small slug of permeable material closely adjacent the side opposite the operating surface of the Hall switch 51. This will help promote the magnetic flux path to be transversely through the Hall switch 51.

The electrical circuit 55 is shown in FIG. 7 and includes the Hall effect switches 51 and 52 which are transducers actuated by the changing magnetic flux from the multiple pole tachometer rotor 41. The Hall effect switches are passive devices which require that an operating voltage be applied in one plane and in a perpendicular plane the electrical switching action is achieved. Terminals 80 and 81 are a part of the terminal means 68 and an operating voltage, for example, 12 volts positive and 12 volts negative may be applied to terminals 80 and 81, respectively, and after being regulated by Zener diodes 82 appear as regulated output voltages of plus 10 volts and −10 volts, for example, on conductors 84 and 85, respectively. Each Hall switch has four terminals Nos. 1, 2, 3 and 4 with the plus 10 volts being applied to the terminal 4 on each switch and the terminals No. 1 being connected to a conductor 86 which is 0 volts. The output of each Hall switch appears between terminals 1 and 3. Terminal 3 on Hall switch 51 is connected to an output terminal 87 and the third terminal on Hall switch 52 is connected to an output terminal 88. Amplifiers may be provided in this connection if desired in order to increase the output power. One digital signal output is obtained between terminal 87 and the zero volt conductor 86 and a second digital output is obtained between terminal 88 and the conductor 86. In this manner the tachometer 12 provides a two phase digital signal output.

This circuit 55 also includes means to provide an analog signal output. A digital to analog convertor 91 is provided and has a digital input from the terminal 3 of the Hall switch 51. The output is on a conductor 92 as an analog signal, the magnitude of which depends upon the frequency input of the digital signal. This analog output is passed to an operational amplifier 94 through a circuit 93 which may be an inverter circuit. This circuit 93 includes switches shown as FET switches 95 and 96. When the FET switches 95 are turned on, the analog signal is supplied directly to a non-inverting input terminal 97 of the operational amplifier 94. When the FET switches 96 are turned on the analog signal is supplied directly to the inverting input terminal 98 of the amplifier 94. In this way the analog signal on the output terminal 99 is made either positive or negative depending upon which pair of FET switches is on.

A D flip-flop 102 is provided in the circuit 55. This D flip-flop has a D or data input on a terminal 103 from the third terminal of the Hall switch 52. The clock input terminal 104 of this flip-flop is connected to the third terminal of Hall switch 51. A D or data flip-flop is one wherein when the input is clocked on the clock input 104, then whatever signal, either logic zero or logic one, that is present on the data input terminal 103 will be clocked through to appear on the Q output terminal 105. The $\overline{Q}$ output terminal 106 is of course of the opposite logic condition. The Q terminal 105 is connected to turn on the FET switches 95 and the $\overline{Q}$ terminal is connected to turn on the FET switches 96 when such terminal is a logic one condition.

OPERATION

The tachometer 12 has the advantage that it may be installed in the dynamoelectric machine 11 at the time of the initial manufacture and sale or may be readily installed in the field at a later date. If installed later, the cover 37 may be removed for access to the recess 43. The tachometer stator 42 may be mounted in position and the locator means provided by the dowel pins 63 will fit within the close tolerance apertures 64 in the front end bracket 22. The tachometer frame 50 may be secured in position by the mounting screw 65. The cable 69 may be passed through the fitting 70 for connection to the terminal means 68. The tachometer rotor 41 may be slipped over the end of the shaft 20 and secured in any convenient manner, as by the set screws 47. The locator means 63 thus provides proper location of the stator and rotor of the tachometer for both air gap and concentricity. The cover 73 may then be remounted to enclose the tachometer 12 within the recess 43.

The tachometer 12 may be easily calibrated in the field by means of a counter and timer such as a stop watch. In the preferred embodiment, the rotor 41 may have 60 north poles and 60 south poles for a 120 pole rotor providing 60 pulses per revolution per Hall switch. The dynamoelectric machine 11 may be operated at some calibrating speed, for example, 1000 rpm and at such speed there should be 60 thousand pulses provided on the digital output terminals 86 and 87 in 1 minute's time. The speed of the machine 11 may thus be adjusted to provide such counted number of 60 thousand pulses in 60 seconds. The range adjustment potentiometer 58 may then be moved by some external tool such as a screw driver to provide the predetermined analog output voltage for that speed. Merely as an example this might be 8 volts at the speed of 1000 rpm. In this manner the tachometer 12 may be used to calibrate itself rather than requiring one to connect some precalibrated tachometer in a temporary manner in order to calibrate the built in tachometer 12.

Where the dynamoelectric machine 11 has double shaft extension, as shown in FIG. 1, then the tachometer 12 built within an axial recess in the front end bracket 22 is especially valuable. The front end shaft extension may be used to drive a fan 28 for a totally enclosed fan cooled motor 11 and the fan cover 27 may be mounted on the C face register fit or shoulder 26 on the front end bracket 22. This mounting may be made without interference with the tachometer 12 and may be made whether or not such tachometer is present in the machine 11.

FIG. 1 illustrates one form of prior art tachometer 32 in dotted lines which was a prior art form of mounting such tachometer on the outboard end of the fan cover 27. It was mounted on the spider 33 with the spider required in order that air might enter between the legs of the spider. Many other prior art tachometers were not nearly as compact in axial dimension as shown from the tachometer 32. In many cases it was necessary to mount a cantilever bracket axially extending from the spider 33. Then on this cantilever bracket one would mount a separate free standing tachometer and couple it to the small diameter shaft extension 35 by a flexible coupling or universal joint. This made a very long extending tachometer which was cumbersome and in many cases could not be accommodated in the environment of the motor 11. Some prior art tachometers which were combined digital and analog output tachometers extended as much 21 inches from the face of the mounting, in this case the outboard face of the fan cover 27.

Further in many cases if the motor 11, as a totally enclosed fan cooled motor, was supplied without a tachometer, the shaft 20 might not be any longer than necessary to just mount the fan 28. In such case it did not extend out to the screen 29 and there was not any way in which a tachometer could be mounted outboard of the motor 11. In the present case the shaft 20, even if for only a single ended shaft motor, will always extend at least to the outer face 25 of the front end bracket 22, which face is that on which the C face register fit shoulder 26 is provided. Accordingly, there is always the provision for field installation of the tachometer 12.

The tachometer 12 may be provided in many different frame sizes of dynamoelectric machines 11, for example, frame sizes 180 to 400. If the shaft at that axial location does not have the proper diameter, then the metal hub 44 may be readily machined to accept the shaft diameter as it exists in the machine 11.

Typical Hall switches currently available are turned on at a flux density of 50 to 100 gauss and turned off at $-50$ to $-100$ gauss. The alternate north and south poles may be magnetized in the rim 46. Pole strengths at the peripheral surface of the rotor rim may be in the range from 350 to 400 gauss and the air gap may be in the order of 0.025 to 0.050 inches. This may include any plastic covering over the operating surface of the Hall switches 51 and 52. The peripheral distance between adjacent north and south poles may be in the order of 0.100 inches in order to minimize interpolar leakage flux and to maximize the useful air gap flux.

In the tachometer 12 there is means included in the rotor 41 and the transducer means 51, 52 to sense direction as well as rotational speed of the tachometer rotor 41. In the preferred embodiment this is provided by using two Hall switches 51 and 52 with the associated circuit 55. The stator frame 50 accurately locates the Hall switches relative to the rotor especially by the locator means 63. The stator frame 50 also accurately locates the two Hall switches so that the square wave outputs thereof are substantially 90 electrical degrees apart. In order to do this the circumferential spacing between the Hall switches is $p(n + \frac{1}{2})$ where $n$ is any integer and $p$ is the circumferential pole pitch between adjacent north and south poles.

FIG. 7 illustrates the electrical circuit 55 and shows why the nominal 90° phasing between the Hall switches 51 and 52 is preferred. This phase displacement may not be exactly 90° in fact it may be most any angle other than 180° and integral multiples thereof. On FIG. 7 square wave inputs are drawn at the data input 103 and the clock input 104 of the flip-flop 102. This D flip-flop will trigger upon a positive going logic signal input as shown by the arrow 108. If the data input from the Hall switch 52 lags the signal from the Hall switch 51, then at the time of triggering or clocking the flip-flop 102, the data input will be a logic zero as shown at time 109. Thus Q will be a zero and $\bar{Q}$ will be logic one. This turns on the FET switches 96 supplying the analog signal to the inverting input 98 of the operational amplifier 94 and thus the analog signal output at terminal 99 is negative. Conversely, if the Hall switch 52 leads the Hall switch 51 by nominally 90° or any range from 1° to 179°, then the signal clocked through the flip-flop 102 will make Q terminal 105 a logic one, turning on FET switches 95 and supplying the output of the digital to analog converter 91 to the non-inverting input 97 of the operational amplifier 94. Thus the analog output signal at terminal 99 will be a positive signal. In this manner the circuit 55 senses clockwise or counter clockwise rotation of the rotor 41.

It will be noted that the recess 43 establishes that the tachometer rotor 41 is mounted in the same longitudinal position as the tachometer stator 42, these two elements at least partially overlap in a longitudinal direction.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A combined dynamoelectric machine and tachometer enclosed within a single frame, comprising in combination, an end bracket forming a part of said frame and surrounding a rotatable shaft of the machine, wall means defining recess means in said end bracket, a tachometer rotor mounted within said recess means and connected to be rotated in accordance with rotation of said shaft of the machine, said tachometer rotor having a plurality of magnetic poles, magnetically responsive first and second transducer means having an electrical output, means mounting both said transducer means in said recess means close to said magnetic poles of said rotor to be magnetically actuated by rotation of said tachometer rotor, means including said rotor and both said transducer means to sense direction as well as rotational speed of said tachometer rotor, said second transducer means being mounted in a position spaced from said first transducer means by a distance $p(n + \frac{1}{2})$, where $n$ is any integer and $p$ is the pole pitch between adjacent north and south poles, said direction sensing means including a D flip-flop,
one transducer means being connected to the clock input of said flip-flop and the other transducer means being connected to the data input of said flip-flop,
and amplifier means connected to the Q and $\overline{Q}$ outputs of said flip-flop to establish a negative or a positive output from said amplifier in accordance with first and second directions of rotation of the machine, respectively.

2. A combined dynamoelectric machine and tachometer as set forth in claim 1, wherein said amplifier means includes first and second smeiconductor switches having inputs connected to said Q and $\overline{Q}$ outputs and having outputs connected to the inverting and non-inverting inputs of an operational amplifier.

3. A tachometer stator for use with a tachometer rotor having a given radius and having magnetic poles, said stator comprising, in combination,
  a base,
  a transducer having an operating surface and mounted on said base,
  speed signal processing circuitry mounted on said base and having an input connected to said transducer,
  terminal means on said base for a speed signal output from said processing circuitry and for power supply input to said processing circuitry,
  a calibration device on said base connected to calibrate said speed signal output,
  and an externally accessible adjustment on said calibration device.

4. A tachometer stator as set forth in claim 3, wherein said tachometer stator is enveloped in hardened plastic material with said operating surface of said transducer closely adjacent an outer surface of said hardened plastic, and said hardened plastic material establishing the tachometer stator as resistant to chemical and moisture environments.

5. A tachometer stator as set forth in claim 3, including means to establish a digital signal output from said transducer at said terminal means.

6. A tachometer stator as set forth in claim 3, wherein said calibration device is connected to said speed signal processing circuitry to adjust the gain thereof.

7. A tachometer stator as set forth in claim 3, including a high permeability shield at least partly enclosing said transducer for a magnetic flux shield.

8. A tachometer stator as set forth in claim 3, wherein said transducer is a Hall effect switch and said power supply input is connected to supply an operating voltage to said Hall effect switch.

9. A tachometer stator as set forth in claim 3, including locator means on said base for accurate location of said transducer operating surface relative to a tachometer rotor for the proper air gap there between.

10. A tachometer stator as set forth in claim 3, including a second transducer having an operating surface and mounted on said base,
  and said locator means establishing the proper air gap between a tachometer rotor and the operating surface of each transducer.

11. A tachometer stator as set forth in claim 10, including means mounting said two transducers on said base along an arc spaced apart a distance $p(n + \frac{1}{2})$ where $n$ is any integer and $p$ is the pole pitch between adjacent north and south poles on the rotor.

12. A tachometer stator as set forth in claim 9, wherein said locator means includes dowel pins on said base.

13. A tachometer stator as set forth in claim 3, wherein said processing circuitry includes a digital to analog converter for providing an analog signal output at said terminal means.

* * * * *